US011018837B2

United States Patent
Tang

(10) Patent No.: US 11,018,837 B2
(45) Date of Patent: May 25, 2021

(54) RESOURCE ALLOCATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/061,867

(22) Filed: Oct. 2, 2020

(65) Prior Publication Data

US 2021/0021398 A1 Jan. 21, 2021

Related U.S. Application Data

(63) Continuation of application No. PCT/CN2018/106337, filed on Sep. 18, 2018.

(51) Int. Cl.
*H04L 5/00* (2006.01)
*H04W 72/04* (2009.01)
(Continued)

(52) U.S. Cl.
CPC .......... *H04L 5/0092* (2013.01); *H04L 5/0094* (2013.01); *H04W 72/0413* (2013.01);
(Continued)

(58) Field of Classification Search
CPC ... H04L 5/0092; H04L 5/0094; H04L 5/0007; H04W 72/0413; H04W 74/008;
(Continued)

(56) References Cited

U.S. PATENT DOCUMENTS

2019/0109732 A1* 4/2019 Choi ................. H04W 72/0446
2019/0239198 A1* 8/2019 Zhang ................. H04W 72/082
(Continued)

FOREIGN PATENT DOCUMENTS

| CN | 107911203 A | 4/2018 |
|----|-------------|--------|
| CN | 108366424 A | 8/2018 |

(Continued)

OTHER PUBLICATIONS

Hua Wei et al. "UL SRS Design for Beam Management and CSI Acquisition" 3GPP TSG RAN WGJ Meeting #90, RI-1712238, Aug. 12, 2017 (Aug. 12, 2017), text, sections 1-3, and figures 1-3 (12 pages).
(Continued)

*Primary Examiner* — Brian T O Connor
(74) *Attorney, Agent, or Firm* — Perkins Coie LLP

(57) ABSTRACT

Implementations of this disclosure provide a resource allocation method, a terminal device, and a network device. The method includes: receiving, by a terminal device, first indication information sent by a network device, the first indication information being used for determining frequency domain units included in a first interlace on a first BWP; and determining, by the terminal device, the frequency domain units included in the first interlace according to the first indication information.

13 Claims, 4 Drawing Sheets

(51) Int. Cl.
　　 *H04W 74/00* (2009.01)
　　 *H04W 72/08* (2009.01)
　　 *H04W 72/12* (2009.01)

(52) U.S. Cl.
　　 CPC ..... *H04W 72/0453* (2013.01); *H04W 74/008* (2013.01); *H04L 5/0007* (2013.01); *H04W 72/044* (2013.01); *H04W 72/082* (2013.01); *H04W 72/1289* (2013.01)

(58) Field of Classification Search
　　 CPC ........... H04W 72/0453; H04W 72/044; H04W 72/082; H04W 72/1289
　　 See application file for complete search history.

(56) References Cited

U.S. PATENT DOCUMENTS

2019/0268090 A1* 8/2019 Wang ................ H04W 72/1268
2020/0245324 A1* 7/2020 Kim ..................... H04W 4/06
2020/0296758 A1* 9/2020 Li ........................ H04L 5/001
2020/0314845 A1* 10/2020 Miao ...................... H04L 5/00

FOREIGN PATENT DOCUMENTS

| EP | 2416619 A1 | 2/2012 |
| EP | 3432664 A1 | 1/2019 |
| EP | 3567955 A1 | 11/2019 |
| WO | 2017170887 A1 | 10/2017 |

OTHER PUBLICATIONS

International Search Report dated Jun. 3, 2019 of PCT/CN2018/106337 (4 pages).
EPO, Extended European Search Report for European Patent Application No. 18933927.8. dated Apr. 15, 2021. 13 pages.
Samsung "Details on resource pool design" 3GPP Draft; R1-164764; vol. RAN WG1, May 14, 2016.

* cited by examiner

RESOURCE ALLOCATION METHOD, TERMINAL DEVICE, AND NETWORK DEVICE

CROSS-REFERENCE TO RELATED DISCLOSURE

This application is a continuation application of International Application No. PCT/CN2018/106337 filed on Sep. 18, 2018, and the entire disclosure of the application is hereby incorporated by reference.

TECHNICAL FIELD

Implementations of this disclosure relate to the communications field, and more specifically, to a resource allocation method, a terminal device, and a network device.

RELATED ART

During communication on an unlicensed spectrum, a signal transmitted on an unlicensed spectrum channel is required to occupy at least a certain proportion of the channel band width according to some laws and regulations. For example, a signal of a 5 GHz frequency band occupies 80% of the channel band width, and a signal of a 60 GHz frequency band occupies 70% of the channel band width. In addition, to prevent excessive power of signals transmitted on the unlicensed spectrum channel from affecting transmission of other important signals such as a radar signal on the channel, some laws and regulations stipulate the maximum power spectrum density of a communications device when transmitting the signals by using the unlicensed spectrum channel.

With the development of wireless communications technologies, a licensed-assisted access long term evolution (LAA-LTE) system provides a service for a terminal device by using a carrier aggregation structure as a basis, a carrier on the licensed spectrum as a primary carrier, and a carrier on an unlicensed spectrum as a secondary carrier. During transmission of an uplink data channel in the LAA-LTE system, to satisfy an indicator that the signal occupies at least 80% of the channel band width and maximum uplink signal transmission power when the terminal device transmits uplink data, a basic unit of the uplink resource allocation is in an interlace structure.

However, in the LAA-LTE system, a subcarrier spacing (SCS) is fixed as 15 kHz, and a size of the SCS in a new radio (NR) system may have a plurality of configurations. For example, on the 5 GHz frequency band, the SCS may be 15 kHz, 30 kHz, 60 kHz, or the like. Therefore, when the NR technology is applied to the unlicensed spectrum, the interlace structure needs to be redesigned based on different SCSs.

SUMMARY

Implementations of this disclosure provide a resource allocation method, a terminal device, and a network device.

According to a first aspect, a resource allocation method is provided, and the method includes:

receiving, by a terminal device, first indication information sent by a network device, the first indication information being used for determining frequency domain units included in a first interlace on a first BWP; and determining, by the terminal device, the frequency domain units included in the first interlace according to the first indication information.

It should be noted that, the method may be applied to the NR-U system, and may support a plurality types of SCSs.

According to a second aspect, a resource allocation method is provided, and the method includes:

sending, by a network device, first indication information to a terminal device, the first indication information being used for determining frequency domain units included in a first interlace on a first BWP.

According to a third aspect, a terminal device is provided, and is configured to perform the method according to the first aspect or implementations thereof.

Specifically, the terminal device includes functional modules configured to perform the method according to the first aspect or implementations thereof.

According to a fourth aspect, a network device is provided, and is configured to perform the method according to the second aspect or implementations thereof.

Specifically, the network device includes functional modules configured to perform the method according to the second aspect or implementations thereof.

According to a fifth aspect, a terminal device including a processor and a memory is provided. The memory is configured to store a computer program, and the processor is configured to invoke and run the computer program stored in the memory to perform the method according to the first aspect or implementations thereof.

According to a sixth aspect, a network device including a processor and a memory is provided. The memory is configured to store a computer program, and the processor is configured to invoke and run the computer program stored in the memory to perform the method according to the second aspect or implementations thereof.

According to a seventh aspect, a chip is provided, and is configured to perform the method according to any one of the first aspect and the second aspect or implementations thereof.

Specifically, the chip includes: a processor, configured to invoke a computer program from a memory and run the computer program to enable a device installed with the chip to perform the method according to any one of the first aspect and the second aspect or implementations thereof.

According to an eighth aspect, a computer-readable storage medium is provided. The computer-readable storage medium is configured to store a computer program, and the computer program enables a computer to perform the method according to any one of the first aspect and the second aspect or implementations thereof.

According to a ninth aspect, a computer program product is provided. The computer program product includes a computer program instruction, and the computer program instruction enables a computer to perform the method according to any one of the first aspect and the second aspect or implementations thereof.

According to a tenth aspect, a computer program is provided. When the program is run on a computer, the computer is enabled to perform the method according to any one of the first aspect and the second aspect or implementations thereof.

DETAILED DESCRIPTION

The technical solutions in the implementations of this disclosure are described in the following with reference to the accompanying drawings in the implementations of this disclosure. It is obvious that the described implementations are some rather than all of the implementations of this disclosure. All other implementations obtained by a person of ordinary skill in the art based on the implementations of this disclosure without creative efforts shall fall within the protection scope of this disclosure.

The implementations of this disclosure may be applied to various communications systems such as a global system for mobile communications (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunications system (UMTS), a wireless local area network (WLAN), wireless fidelity (Wi-Fi), a next generation communications system or other communications systems.

Generally, a quantity of connections supported by a conventional communications system is limited and the connections are easy to implement. However, with the development of communications technologies, a mobile communications system may not only support conventional communication, but also support, for example, device to device (D2D) communication, machine to machine communication (M2M), machine type communication (MTC), and vehicle to vehicle (V2V) communication. The implementations of this disclosure may also be applied to these communications systems.

Optionally, the communications systems in the implementations of this disclosure may be applied to a carrier aggregation (CA) scenario, or be applied to a dual connectivity (DC) scenario, or be applied to a standalone (SA) net scenario.

The applied spectrum is not limited in the implementations of this disclosure. For example, the implementations of this disclosure may be applied to a licensed spectrum, or may be applied to an unlicensed spectrum.

Figure 1:
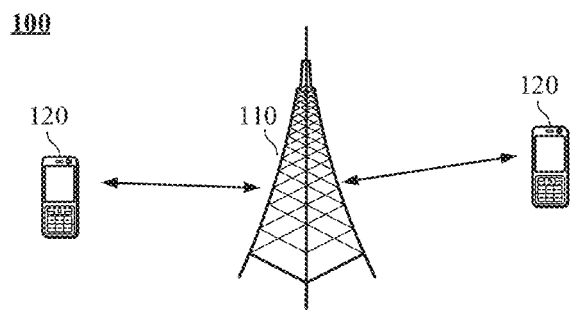
FIG. 1 is a schematic diagram of a communications system architecture according to an implementation of this disclosure.

For example, a communications system 100 applied in an implementation of this disclosure is shown in FIG. 1. The communications system 100 may include a network device 110, and the network device 110 may be a device communicating with a terminal device 120 (or referred to as a communications terminal or a terminal). The network device 110 may provide communication coverage for a particular geographical area, and may communicate with a terminal device that is located in the coverage area.

In the implementations of this disclosure, when a resource allocation unit is in an interlace structure, because an NR-based access to unlicensed spectrum (NR-U) system may support a plurality types of subcarrier spacings (SCSs), at a configured band width part (BWP), resource allocation using the interlace as the unit under different SCSs may be determined by configuring different offset values for different SCSs, which is convenient for the network device to perform resource allocation. FIG. 1 illustratively shows one network device and two terminal devices. Optionally, the communications system 100 may include a plurality of network devices, and in a coverage area of each network device, another quantity of terminal devices may be included. This is not limited in the implementations of this disclosure.

Optionally, the communications system 100 may further include another network entity such as a network controller or a mobility management entity. This is not limited in the implementations of this disclosure.

It should be understood that, in a network/system in the implementations of this disclosure, a device having a communication function may be referred to as a communications device. Using the communications system 100 shown in FIG. 1 as an example, the communications device may include a network device 110 and a terminal device 120 that each has a communication function. The network device 110 and the terminal device 120 may be specific devices described above. Details are not described herein again. The communications device may further include other devices in the communications system 100, for example, other network entities such as a network controller and a mobility management entity. This is not limited in the implementations of this disclosure.

The implementations of this disclosure describe each implementation with reference to the terminal device and the network device. The terminal device may be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a station (ST) in a WLAN, may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, an in-vehicle device, a wearable device, or a next generation communications system, for example, a terminal device in the NR network, a terminal device in a future evolved public land mobile network (PLMN), or the like.

As an example rather than a limitation, in the implementations of this disclosure, the terminal device may also be a wearable device. A wearable device may also be referred to as a wearable intelligent device, and is a general term of wearable devices, such as glasses, gloves, watches, clothes, and shoes, that are developed by applying wearable technologies in intelligent designs of daily wear. A wearable device is a portable device that can be directly worn on a body or integrated into clothes or an accessory of a user. A wearable device is not only a hardware device, but also used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of disclosure and need to work with other devices such as smartphones, such as various smart bracelets or smart jewelry for monitoring physical signs.

The network device may be a device configured to communicate with a mobile device. The network device may be an access point (AP) in a WLAN or a base transceiver station (BTS) in GSM or CDMA; or may be a NodeB (NB) in WCDMA; or may be an evolved NodeB (eNB or eNodeB) in LTE, or a relay station or an AP, or an in-vehicle device, a wearable device, a network device (gNB) in the NR network, a network device in a future evolved PLMN network, or the like.

In the implementations of this disclosure, the network device provides a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell. The small cell herein may include: a metro cell, a micro cell, a pico cell, a femto cell, and the like. These small cells have features of small coverage and low transmit power, and are suitable for providing high-speed data transmission services.

Figure 2:
FIG. 2 is a schematic diagram of an interlace structure in the LAA-LTE according to an implementation of this disclosure.

It should be understood that, during transmission of an uplink data channel in the LAA-LTE system, to satisfy an indicator that the signal occupies at least 80% of the channel band width and maximum uplink signal transmission power when the terminal device transmits the uplink data, a basic unit of the uplink resource allocation is in an interlace structure. For example, the interlace structure is shown in FIG. 2. When the channel band width is 20 MHz, the system includes 100 physical resource blocks (PRBs), and the 100 PRBs are divided into 10 interlaces, each interlace including 10 PRBs, and spacings between any two adjacent PRBs of the 10 PRBs being the same in the frequency domain. For example, the PRBs included in an interlace #0 are PRB 0, PRB 10, PRB 20, PRB 30, PRB 40, PRB 50, PRB 60, PRB 70, PRB 80, and PRB 90.

When the NR technology is applied to the unlicensed spectrum, interlace structure designs of different subcarrier spacings (SCSs) under a same band width scenario should be considered. A minimum band width for channel listening is 20 MHz, so that the interlace structure may be designed based on the band width of 20 MHz. According to the NR system, a maximum quantity of PRBs that can be transmitted and a size of a guard band that needs to be reserved under different SCSs in the band width of 20 MHz are shown in Table 1 and Table 2 respectively.

TABLE 1

| The maximum quantity of PRBs configured on a transmission band width ($N_{RB}$) | | | | | | | | | | | | | |
|---|---|---|---|---|---|---|---|---|---|---|---|---|---|
| SCS [kHz] | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
| 15 | 25 | 52 | 79 | 106 | 133 | 160 | 216 | 270 | N.A | N.A | N.A | N.A | N.A |
| 30 | 11 | 24 | 38 | 51 | 65 | 78 | 106 | 133 | 162 | 189 | 217 | 245 | 273 |
| 60 | N.A | 11 | 18 | 24 | 31 | 38 | 51 | 65 | 79 | 93 | 107 | 121 | 135 |

TABLE 2

| The minimum value of a reserved guard spacing (unit: kHz) | | | | | | | | | | | | | |
|---|---|---|---|---|---|---|---|---|---|---|---|---|---|
| SCS [kHz] | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 60 | N.A | 1010 | 990 | 1330 | 1310 | 1290 | 1610 | 1570 | 1530 | 1490 | 1450 | 1410 | 1370 |

It should be understood that, the implementations of this disclosure may be applied to resource allocation in transmitting an uplink physical channel or a downlink physical channel; or an uplink reference signal or a downlink reference signal.

Optionally, in the implementations of this disclosure, the downlink physical channel may include a physical downlink control channel (PDCCH), an enhanced physical downlink control channel (EPDCCH), a physical downlink shared channel (PDSCH), a physical hybrid ARQ indicator channel (PHICH), a physical multicast channel (PMCH), a physical broadcast channel (PBCH), and the like. The downlink reference signal may include a downlink synchronization signal, a phase tracking reference signal (PT-RS), a downlink demodulation reference signal (DMRS), a channel state information-reference signal (CSI-RS), a tracking reference signal (TRS), and the like. The downlink reference signal may be applied to a communications device access network and wireless resource management measurement, downlink channel demodulation, downlink channel measurement, downlink time and frequency synchronization, phase tracking, or the like. It should be understood that, compared with the foregoing, the implementations of this disclosure may include a downlink physical channel or a downlink reference signal having the same name but a different function, or may include a downlink physical channel or a downlink reference signal having a different name but the same function, which is not limited in this disclosure.

Optionally, in the implementations of this disclosure, the uplink physical channel may include a physical random access channel (PRACH), a physical uplink control channel (PUCCH), a physical uplink shared channel (PUSCH), and the like. The uplink reference signal may include an uplink DMRS, a sounding reference signal (SRS), a PT-RS, and the like. The uplink reference signal may be applied to uplink channel modulation, uplink channel measurement, uplink time and frequency synchronization, phase tracking, or the like. It should be understood that, compared with the foregoing, the implementations of this disclosure may include an uplink physical channel or an uplink reference signal having the same name but a different function, or may include an uplink physical channel or an uplink reference signal having a different name but the same function, which is not limited in this disclosure.

Without loss of generality, the uplink channel transmission is used as an example in the implementations of this disclosure to describe steps in the implementations of this disclosure.

Figure 3:
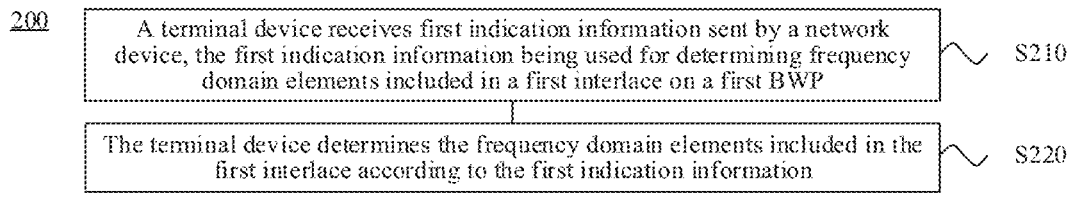
FIG. 3 is a schematic flowchart of a resource allocation method according to an implementation of this disclosure.

FIG. 3 is a schematic flowchart of a resource allocation method 200 according to an implementation of this disclosure. As shown in FIG. 3, the method 200 may include the following content:

S210: A terminal device receives first indication information sent by a network device, the first indication information being used for determining frequency domain units included in a first interlace on a first BWP.

S220: The terminal device determines the frequency domain units included in the first interlace according to the first indication information.

Optionally, the first indication information is used for indicating an index of the first interlace.

Optionally, the first interlace is an interlace corresponding to a first SCS, the first SCS being an SCS corresponding to the first BWP.

Optionally, the network device configures a starting point and a length of a first carrier for the terminal device according to a second SCS, and configures a starting point and a length of the first BWP on the first carrier for the terminal device according to the first SCS, the first SCS being the SCS corresponding to the first BWP, and the second SCS being an SCS corresponding to the first carrier.

In the implementations of this disclosure, it is assumed that the first BWP includes N frequency domain units, N being a positive integer. The first BWP includes M interlaces, M being a positive integer.

Optionally, a value of M is preset (for example, which is specified by a standard, or agreed on by the network device and the terminal device); or the value of M is indicated to the terminal device by the network device through third indication information (the third indication information may be high layer signaling or physical layer signaling). The high layer signaling includes radio resource control (RRC) signaling or media access control (MAC) signaling, and the physical layer signaling includes downlink control information (DCI).

Optionally, for different SCSs, values of N corresponding to the first BWP are different; and/or, for different SCSs, values of M corresponding to the first BWP are different.

Optionally, a size of the first BWP is approximately 20 MHz.

It should be understood that, one frequency domain unit may be one or more PRBs, or may be one or more subcarriers (for example, one frequency domain unit includes 6 subcarriers, that is, a half PRB), which is not limited in this disclosure. When a frequency domain unit includes at least two subcarriers, the at least two subcarriers may be continuous, or may be discontinuous on a frequency domain (for example, frequency domain distances between any two adjacent subcarriers in the at least two subcarriers are equal and discontinuous), which is not limited in this disclosure.

Optionally, in the implementations of this disclosure, the terminal device may determine the frequency domain units included in the first interlace according to a first offset value and the first indication information.

Optionally, the first offset value is an integral quantity of frequency domain units, or the first offset value is a fractional quantity of frequency domain units.

For example, the first offset value is 0.5 of frequency domain units.

Optionally, the first offset value is determined according to the first SCS (or, a unit of the first offset value is determined according to the first SCS), the first SCS being a SCS corresponding to the first BWP.

Optionally, the first offset value is determined according to the second SCS (or, a unit of the first offset value is determined according to the second SCS), the second SCS being a SCS corresponding to the first carrier.

Optionally, the first offset value is an offset value corresponding to the first SCS on the first BWP.

Optionally, offset values under different SCSs are different.

For example, when the first SCS is 30 kHz, the first offset value is 2.

For another example, when the first SCS is 15 kHz, the first offset value is 6.

Optionally, offset values under different SCSs have the same value but different units.

For example, a first offset value under 15 kHz SCS is a frequency domain unit with a 15 kHz SCS, a first offset value under 30 kHz SCS is a frequency domain unit with a 30 kHz SCS, and a first offset value under 60 kHz SCS is a frequency domain unit with a 60 kHz SCS.

Optionally, the first subcarriers in the first frequency domain unit in different basic interlaces under different SCSs are aligned with each other on the frequency domain.

Optionally, the terminal device determines the frequency domain units included in the basic interlace according to the first offset value, and the terminal device determines the frequency domain units included in the first interlace according to the frequency domain units included in the basic interlace and the first indication information.

It should be noted that, the basic interlace may be understood as a reference interlace. In other words, the basic interlace may be used for determining other interlaces. For example, the basic interlace is an interlace #0, and a frequency domain unit included in interlaces other than the interlace #0 is determined according to the frequency domain unit included in the interlace #0.

Optionally, in the implementations of this disclosure, a frequency domain unit X included in the basic interlace satisfies that:

$$\mathrm{Mod}(X,M) = \text{the first offset value, where}$$

Mod represents a modulus operation, X represents an index of the frequency domain unit included in the basic interlace, and a value of X ranges from 0 to N−1, M represents a total quantity of interlaces included in the first BWP, N represents a total quantity of frequency domain units included in the first BWP, and M and N are positive integers.

It should be noted that, in this case, the first offset value is only provided for the basic interlace. For example, the first offset value may be an offset value only provided for the basic interlace. That is, the terminal device may determine the frequency domain units included in the basic interlace according to the first offset value.

Optionally, the terminal device may determine PRBs included in other interlace indexes according to the basic interlace.

For example, the index of the basic interlace is the interlace #0, and Mod(X, M)=the first offset value, so that:

a frequency domain unit Z1 included in an interlace #1 satisfies that: Mod(Z1, M)=the first offset value+1;

a frequency domain unit Z2 included in an interlace #2 satisfies that: Mod(Z2, M)=the first offset value+2;

a frequency domain unit ZM−1 included in an interlace #M−1 satisfies that: Mod(ZM-1, M)=the first offset value+M−1.

For example, assuming that the first BWP includes 51 frequency domain units (that is, N=51), the 51 frequency domain units correspond to 6 interlaces (that is, M=6), and the first offset value is one frequency domain unit, the frequency domain unit X included in the basic interlace satisfies that:

$$Mod(X, 6)=1,$$

where a value of X ranges from 0 to 50. That is, indexes of the frequency domain units included in the basic interlace are 1, 7, 13, 19, 25, 31, 37, 43, and 49.

Optionally, in the implementations of this disclosure, a frequency domain unit Y included in the first interlace satisfies that:

$$Mod(Y, M)=\text{the first offset value, where}$$

Mod represents a modulus operation, Y represents an index of the frequency domain units included in the first interlace, and a value of Y ranges from 0 to N−1, M represents a total quantity of interlaces included in the first BWP, N represents a total quantity of frequency domain units included in the first BWP, and M and N are positive integers.

It should be noted that, in this case, the first offset value is provided for the first interlace. For example, the first offset value may be a set of offset values provided for the first interlace. For example, when the first interlace includes an interlace #a, an interlace #b, and an interlace #c, the first offset value may be a set of values composed of A, B, and C, where A corresponds to the interlace #a, B corresponds to the interlace #b, and C corresponds to the interlace #c. The terminal device may determine frequency domain units included in the interlace #a according to A, determine frequency domain units included in the interlace #b according to B, and determine frequency domain units included in the interlace #c according to C.

For example, assuming that the first BWP includes 51 frequency domain units (that is, N=51), the 51 frequency domain units correspond to 6 interlaces (that is, M=6), and the first offset value is {2, 5} frequency domain units, the frequency domain unit Y included in the first interlace satisfies that:

$$Mod(Y, 6)=\{2, 5\},$$

where a value of Y ranges from 0 to 50. That is, indexes of the frequency domain units included in the first interlace are 2, 8, 14, 20, 26, 32, 38, 44, 50, 5, 11, 17, 23, 29, 35, 41, and 47.

It should be understood that, in the foregoing resource allocation method, a quantity of frequency domain units included in different interlaces may be the same or different.

As an example not a limitation, an example in which the index of the basic interlace is 0, the first SCS is 30 kHz, the first offset value is 2, the first BWP includes 51 PRBs, and the first BWP includes 4 interlaces is used to describe the implementations of this disclosure.

The index of the PRB included in the interlace #0 satisfies that: Mod(X, 4)=2, where a value of X ranges from 0 to 50, that is, the index of the PRB included in the interlace #0 is {2, 6, 10, 14, 18, 22, 26, 30, 34, 38, 42, 46, 50}.

Optionally, the terminal device may determine PRBs included in other interlace indexes according to the basic interlace.

Optionally, the first indication information may indicate an interlace index included in the first interlace.

It should be noted that, in the implementations of this disclosure, the first interlace may include at least one interlace.

Optionally, in the foregoing example, the first BWP includes 4 interlaces. Therefore, that the first indication information indicates the first interlace may be one of the following situations:

Situation 1: The first interlace includes the interlace #0; the first interlace includes the interlace #1; the first interlace includes the interlace #2; or the first interlace includes the interlace #3.

Situation 2: The first interlace includes the interlace #0 and the interlace #1; the first interlace includes the interlace #0 and the interlace #2; the first interlace includes the interlace #0 and the interlace #3; the first interlace includes the interlace #1 and the interlace #2; the first interlace includes the interlace #1 and the interlace #3; or the first interlace includes the interlace #2 and the interlace #3.

Situation 3: The first interlace includes the interlace #0, the interlace #1, and the interlace #2; the first interlace includes the interlace #1, the interlace #2, and the interlace #3; the first interlace includes the interlace #0, the interlace #2, and the interlace #3; or the first interlace includes the interlace #0, the interlace #1, and the interlace #2.

Situation 4: The first interlace includes the interlace #0, the interlace #1, the interlace #2, and the interlace #3.

Optionally, in the implementations of this disclosure, the terminal device determines the frequency domain units included in the first interlace according to the first offset value and the first indication information.

For example, the first offset value includes an offset value set, and the terminal device determines one or more offset values in the offset value set according to the first indication information, and determines the frequency domain units included in the first interlace according to the one or more offset values.

Optionally, the quantity of the offset values included in the first offset value is less than or equal to the value of M.

As an example not a limitation, when assuming that when the first SCS is 30 kHz, the first BWP includes 51 PRBs, the first BWP includes 4 interlaces, the offset value set includes {0, 1, 2, 3}, and the first indication information is used for determining to use {2, 3} in the offset value set, the index of the PRB included in the first interlace satisfies that: Mod(Y, 4)={2, 3}, where the value of Y ranges from 0 to 50, that is, the index of the PRB included in the first interlace is {2, 6, 10, 14, 18, 22, 26, 30, 34, 38, 42, 46, 50, 3, 7, 11, 15, 19, 23, 27, 31, 35, 39, 43, 47}.

Therefore, through the foregoing resource allocation method, the resource allocation using the interlace as the unit under different SCSs can be implemented.

Optionally, in the implementations of this disclosure, the terminal device determines that there is at least one frequency domain unit in the first BWP incapable of being integrally divided by the first interlace, the at least one frequency domain unit being located at a first reserved position in the first BWP. In this case, the terminal device determines the frequency domain units included in the first interlace according to the first reserved position and the first indication information.

Optionally, the terminal device determines the frequency domain units included in the first interlace according to the first reserved position and the first indication information, and the first interlace does not include the frequency domain unit at the first reserved position.

Optionally, the first BWP is incapable of being integrally divided by the first interlace, that is, the frequency domain units included in the first BWP are incapable of being integrally divided by the interlace. In other words, in a case that quantities of the frequency domain units included in all interlaces are the same, the first BWP further includes a frequency domain unit belonging to no interlaces in addition to the integral quantity of interlaces. For example, assuming that the first BWP includes 106 PRBs, and the first BWP includes 10 interlaces, where each interlace includes 10 PRBs. That is, the first BWP further includes 6 PRBs incapable of being integrally divided by the interlace in addition to the 100 PRBs corresponding to the 10 interlaces. The 6 PRBs are located at the first reserved position in the first BWP.

Optionally, the first reserved position includes a center position of the first BWP.

Optionally, the first reserved position includes one side of the first BWP.

Optionally, a frequency domain unit corresponding to the first reserved position is used for transmitting an uplink channel in a case of continuous resource allocation. That is, in the first BWP, there is a frequency domain unit used for transmitting an uplink channel in a case of continuous resource allocation, and the terminal device may transmit the uplink channel through continuous frequency domain units at the first reserved position.

For example, the uplink channel is a PUCCH or a PRACH.

Therefore, through the foregoing structure division, the PRB incapable of being integrally divided is reserved at the center position of the band width, which facilitates transmission of the PRACH in a case of continuous resource allocation.

Optionally, in the implementations of this disclosure, the frequency domain units included in the first interlace include a first sub-interlace and a second sub-interlace, the first sub-interlace being used for transmitting a first uplink channel, and the second sub-interlace being used for transmitting a second uplink channel.

For example, assuming that the index of the PRB included in the first interlace is {2, 6, 10, 14, 18, 22, 26, 30, 34, 38, 42, 46, 50}, the index of the PRB included in the first sub-interlace is {2, 10, 18, 26, 34, 42, 50}, and the index of the PRB included in the second sub-interlace is {6, 14, 22, 30, 38, 46}.

For another example, assuming that the index of the PRB included in the first interlace is {2, 6, 10, 14, 18, 22, 26, 30, 34, 38, 42, 46, 50}, the index of the PRB included in the first sub-interlace is {2, 6, 10, 14, 18, 22}, and the index of the PRB included in the second sub-interlace is {30, 34, 38, 42, 46, 50}.

Optionally, the first uplink channel is a PRACH, and the second uplink channel is a PUCCH; or the first uplink channel is a PUCCH, and the second uplink channel is a PRACH.

Optionally, the first uplink channel and the second uplink channel are different PUCCHs.

Optionally, the first uplink channel and the second uplink channel are different PRACHs.

Figure 4:
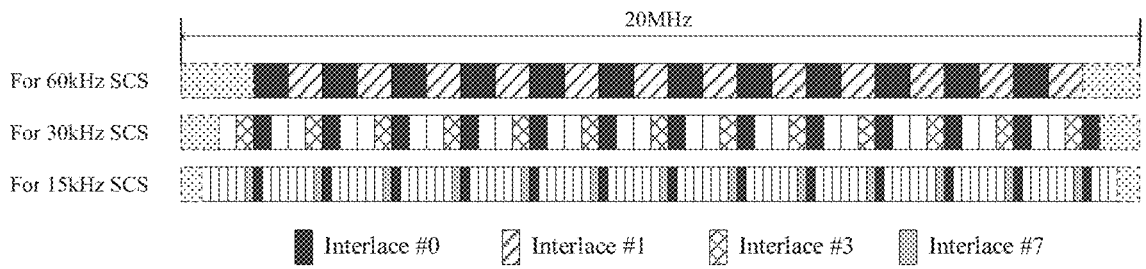
FIG. 4 is a schematic diagram of an interlace structure according to an implementation of this disclosure.

Optionally, in an implementation, as shown in FIG. 4, in a 20 MHz band width, radio frequency (RF) sidebands that need to be reserved for different SCSs are different. Therefore, available resources under different SCSs are different. The interlace index uses a starting point of a resource that is available for each of the plurality of SCSs as a starting point. For PRBs included in one interlace, distances between any two adjacent PRBs are the same.

Optionally, as shown in FIG. 4, in a case of a 60 kHz SCS, 24 PRBs are included in the 20 MHz band width, which can be indexed as 0 to 23 according to an order of available resources. The 24 PRBs may include 2 interlaces, and each interlace includes 12 PRBs:

The interlace #0 includes PRB 0, PRB 2, PRB 4, PRB 6, PRB 8, PRB 10, PRB 12, PRB 14, PRB 16, PRB 18, PRB 20, and PRB 22; and The interlace #1 includes PRB 1, PRB 3, PRB 5, PRB 7, PRB 9, PRB 11, PRB 13, PRB 15, PRB 17, PRB 19, PRB 21, and PRB 23.

Optionally, as shown in FIG. 4 (only the interlace #0 and the interlace #3 are shown in the figure), in a case of a 30 kHz SCS, 51 PRBs are included in the 20 MHz band width, which can be indexed as 0 to 50 according to an order of available resources. The 51 PRBs may include 4 interlaces, and each interlace includes 12 or 13 PRBs:

The interlace #0 includes PRB 2, PRB 6, PRB 10, PRB 14, PRB 18, PRB 22, PRB 26, PRB 30, PRB 34, PRB 38, PRB 42, PRB 46, and PRB 50;

The interlace #1 includes PRB 1, PRB 7, PRB 11, PRB 15, PRB 19, PRB 23, PRB 27, PRB 31, PRB 35, PRB 39, PRB 43, and PRB 47.

The interlace #2 includes PRB 4, PRB 8, PRB 12, PRB 16, PRB 20, PRB 24, PRB 28, PRB 32, PRB 36, PRB 40, PRB 44, PRB 48, and PRB 0; and The interlace #3 includes PRB 5, PRB 9, PRB 13, PRB 17, PRB 21, PRB 25, PRB 29, PRB 33, PRB 37, PRB 41, PRB 45, PRB 49, and PRB 1.

Optionally, as shown in FIG. 4 (only the interlace #0 and the interlace #7 are shown in the figure), in a case of a 15 kHz SCS, 106 PRBs are included in the 20 MHz band width, which can be indexed as 0 to 105 according to an order of available resources. The 106 PRBs may include 8 interlaces, and each interlace includes 13 or 14 PRBs:

The interlace #0 includes PRB 6, PRB 14, PRB 22, PRB 30, PRB 38, PRB 46, PRB 54, PRB 62, PRB 70, PRB 78, PRB 86, PRB 94, and PRB 102;

The interlace #1 includes PRB 7, PRB 15, PRB 23, PRB 31, PRB 39, PRB 47, PRB 55, PRB 63, PRB 71, PRB 79, PRB 87, PRB 95, and PRB 103;

The interlace #2 includes PRB 8, PRB 16, PRB 24, PRB 32, PRB 40, PRB 48, PRB 56, PRB 64, PRB 72, PRB 80, PRB 88, PRB 96, PRB 104, and PRB 0;

The interlace #3 includes PRB 9, PRB 17, PRB 25, PRB 33, PRB 41, PRB 49, PRB 57, PRB 65, PRB 73, PRB 81, PRB 89, PRB 97, PRB 105, and PRB 1;

The interlace #4 includes PRB 10, PRB 18, PRB 26, PRB 34, PRB 42, PRB 50, PRB 58, PRB 66, PRB 74, PRB 82, PRB 90, PRB 98, and PRB 2;

The interlace #5 includes PRB 11, PRB 19, PRB 27, PRB 35, PRB 43, PRB 51, PRB 59, PRB 67, PRB 75, PRB 83, PRB 91, PRB 99 and PRB 3.

The interlace #6 includes PRB 12, PRB 20, PRB 28, PRB 36, PRB 44, PRB 52, PRB 60, PRB 68, PRB 76, PRB 84, PRB 92, PRB 100, and PRB 4; and The interlace #7 includes PRB 13, PRB 21, PRB 29, PRB 37, PRB 45, PRB 53, PRB 61, PRB 69, PRB 77, PRB 85, PRB 93, PRB 101, and PRB 5.

Therefore, through the foregoing structure division, initial positions of the interlaces under different SCSs are the same, which is convenient for the network device to perform BWP configuration or resource allocation by using the same type of SCS.

Optionally, in an implementation, in a case of a 30 kHz SCS, 51 PRBs are included in the 20 MHz band width, which can be indexed as 0 to 50 according to an order of available resources. The 51 PRBs may include 6 interlaces, and each interlace includes 8 or 9 PRBs:

The interlace #0 includes PRB 1, PRB 7, PRB 13, PRB 19, PRB 25, PRB 31, PRB 37, PRB 43, PRB 49;

The interlace #1 includes PRB 2, PRB 8, PRB 14, PRB 20, PRB 26, PRB 32, PRB 38, PRB 44, PRB 50;

The interlace #2 includes PRB 3, PRB 9, PRB 15, PRB 21, PRB 27, PRB 33, PRB 39, PRB 45;

The interlace #3 includes PRB 4, PRB 10, PRB 16, PRB 22, PRB 28, PRB 34, PRB 40, PRB 46;

The interlace #4 includes PRB 5, PRB 11, PRB 17, PRB 23, PRB 29, PRB 35, PRB 41, PRB 47; and The interlace #5 includes PRB 6, PRB 12, PRB 18, PRB 24, PRB 30, PRB 36, PRB 42, PRB 48, PRB 0.

Optionally, in a case of a 15 kHz SCS, 106 PRBs are included in the 20 MHz band width, which can be indexed as 0 to 105 according to an order of available resources. The 106 PRBs may include 10 interlaces, and each interlace includes 10 or 11 PRBs:

The interlace #0 includes PRB 4, PRB 14, PRB 24, PRB 34, PRB 44, PRB 54, PRB 64, PRB 74, PRB 84, PRB 94, and PRB 104;

The interlace #1 includes PRB 5, PRB 15, PRB 25, PRB 35, PRB 45, PRB 55, PRB 65, PRB 75, PRB 85, PRB 95, and PRB 105;

The interlace #2 includes PRB 6, PRB 16, PRB 26, PRB 36, PRB 46, PRB 56, PRB 66, PRB 76, PRB 86, PRB 96;

The interlace #3 includes PRB 7, PRB 17, PRB 27, PRB 37, PRB 47, PRB 57, PRB 67, PRB 77, PRB 87, PRB 97;

The interlace #4 includes PRB 8, PRB 18, PRB 28, PRB 38, PRB 48, PRB 58, PRB 68, PRB 78, PRB 88, PRB 98;

The interlace #5 includes PRB 9, PRB 19, PRB 29, PRB 39, PRB 49, PRB 59, PRB 69, PRB 79, PRB 89, and PRB 99;

The interlace #6 includes PRB 10, PRB 20, PRB 30, PRB 40, PRB 50, PRB 60, PRB 70, PRB 80, PRB 90, PRB 100, and PRB 0;

The interlace #7 includes PRB 11, PRB 21, PRB 31, PRB 41, PRB 51, PRB 61, PRB 71, PRB 81, PRB 91, PRB 101, and PRB 1;

The interlace #8 includes PRB 12, PRB 22, PRB 32, PRB 42, PRB 52, PRB 62, PRB 72, PRB 82, PRB 92, PRB 102, and PRB 2; and The interlace #9 includes PRB 13, PRB 23, PRB 33, PRB 43, PRB 53, PRB 63, PRB 73, PRB 83, PRB 93, PRB 103, and PRB 3.

Figure 5:
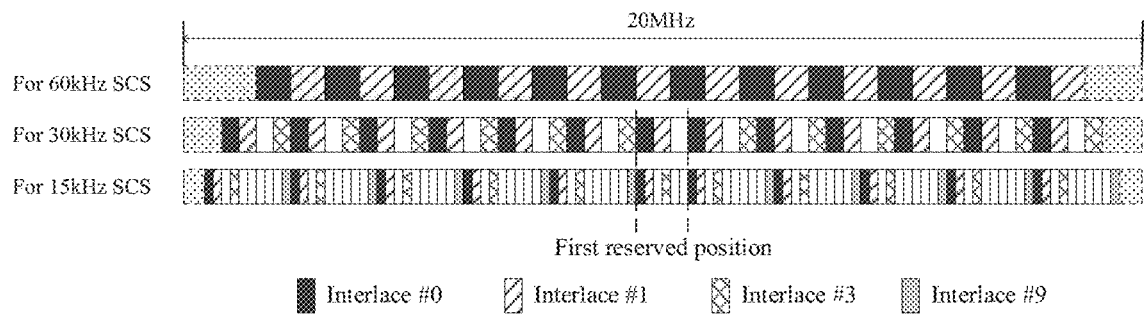
FIG. 5 is a schematic diagram of another interlace structure according to an implementation of this disclosure.

Optionally, in an implementation, as shown in FIG. 5, in a 20 MHz band width, RF sidebands that need to be reserved for different SCSs are different. Therefore, available resources under different SCSs are different. The interlace index uses a starting point of an available resource corresponding to the SCS as a starting point. The PRB included in the interlace does not have a feature that the distances between any two adjacent PRBs in the implementation shown in FIG. 4 are the same, and in this implementation, the PRB incapable of being integrally divided by the interlace is located at a first reserved position. The first reserved position is located at the center position of the band width, and a frequency domain unit corresponding to the first reserved position is used for transmitting an uplink channel in a case of continuous resource allocation, for example, the PUCCH, the PRACH, and the like.

Optionally, as shown in FIG. 5, in a case of a 60 kHz SCS, 24 PRBs are included in the 20 MHz band width, which can be indexed as 0 to 23 according to an order of available resources. The 24 PRBs may include 2 interlaces:

The interlace #0 includes PRB 0, PRB 2, PRB 4, PRB 6, PRB 8, PRB 10, PRB 12, PRB 14, PRB 16, PRB 18, PRB 20, and PRB 22; and The interlace #1 includes PRB 1, PRB 3, PRB 5, PRB 7, PRB 9, PRB 11, PRB 13, PRB 15, PRB 17, PRB 19, PRB 21, and PRB 23.

Optionally, as shown in FIG. 5 (only the interlace #0, the interlace #1, and the interlace #3 are shown in the figure), in a case of a 30 kHz SCS, 51 PRBs are included in the 20 MHz band width, which can be indexed as 0 to 50 according to an order of available resources. The 51 PRBs may include 4 interlaces:

The interlace #0 includes PRB 0, PRB 4, PRB 8, PRB 12, PRB 16, PRB 20, PRB (24), PRB 27, PRB 31, PRB 35, PRB 39, PRB 43, and PRB 47 ((24) represents that the PRB 24 may belong to the interlace #0, or may not belong to the interlace #0, the following is similar and details are not repeated);

The interlace #1 includes a PRB 1, a PRB 5, a PRB 9, a PRB 13, a PRB 17, a PRB 21, a PRB (25), a PRB 28, a PRB 32, a PRB 36, a PRB 40, a PRB 44, and a PRB 48;

The interlace #2 includes PRB 2, PRB 6, PRB 10, PRB 14, PRB 18, a PRB 22, PRB (26), PRB 29, PRB 33, PRB 37, PRB 41, PRB 45, and PRB 49; and The interlace #3 includes PRB 3, PRB 7, PRB 11, PRB 15, PRB 19, PRB 23, PRB 30, PRB 34, PRB 38, PRB 42, PRB 46, and PRB 50.

PRB 24, PRB 25, and PRB 26 incapable of being integrally divided by the interlace are located at the first reserved position.

Optionally, as shown in FIG. 5 (only the interlace #0, the interlace #1, the interlace #3, and the interlace #9 are shown in the figure), in a case of a 15 kHz SCS, 106 PRBs are included in the 20 MHz band width, which can be indexed as 0 to 105 according to an order of available resources. The 106 PRBs may include 10 interlaces:

The interlace #0 includes PRB 0, PRB 10, PRB 20, PRB 30, PRB 40, PRB (50), PRB 56, PRB 66, PRB 76, PRB 86, and PRB 96;

The interlace #1 includes PRB 1, PRB 11, PRB 21, PRB 31, PRB 41, PRB (51), PRB 57, PRB 67, PRB 77, PRB 87, and PRB 97;

The interlace #2 includes PRB 2, PRB 12, PRB 22, PRB 32, PRB 42, PRB (52), PRB 58, PRB 68, PRB 78, PRB 88, and PRB 98;

The interlace #3 includes PRB 3, PRB 13, PRB 23, PRB 33, PRB 43, PRB (53), PRB 59, PRB 69, PRB 79, PRB 89, and PRB 99;

The interlace #4 includes PRB 4, PRB 14, PRB 24, PRB 34, PRB 44, PRB (54), PRB 60, PRB 70, PRB 80, PRB 90, and PRB 100;

The interlace #5 includes PRB 5, PRB 15, PRB 25, PRB 35, PRB 45, PRB (55), PRB 61, PRB 71, PRB 81, PRB 91, and PRB 101;

The interlace #6 includes PRB 6, PRB 16, PRB 26, PRB 36, PRB 46, PRB 62, PRB 72, PRB 82, PRB 92, PRB 102;

The interlace #7 includes PRB 7, PRB 17, PRB 27, PRB 37, PRB 47, PRB 63, PRB 73, PRB 83, PRB 93, PRB 103;

The interlace #8 includes PRB 8, PRB 18, PRB 28, PRB 38, PRB 48, PRB 64, PRB 74, PRB 84, PRB 94, PRB 104; and The interlace #9 includes PRB 9, PRB 19, PRB 29, PRB 39, PRB 49, PRB 65, PRB 75, PRB 85, PRB 95, and PRB 105.

PRB 50, PRB 51, PRB 52, PRB 53, PRB 54, and PRB 55 incapable of being integrally divided by the interlace are located at the first reserved position.

Therefore, through the foregoing structure division, the PRB incapable of being integrally divided by the first interlace is reserved at the first reserved position, which facilitates transmission of the PRACH in a case of continuous resource allocation.

Optionally, a corresponding interlace structure when a waveform used during transmission of the uplink channel is a single carrier (for example, a DFT operation is performed before a frequency domain mapping) is different from a corresponding interlace structure when a waveform used during transmission of the uplink channel is orthogonal frequency division multiplexing (OFDM).

Optionally, when the corresponding interlace structure when waveform used during transmission of the uplink channel is a single carrier is the same as the corresponding interlace structure when the waveform used during transmission of the uplink channel is OFDM, a quantity of frequency domain units that are in the resource allocation corresponding to the single carrier waveform and that are used for signal transmission can be integrally divided by 2, 3, and 5. For example, the resource allocation corresponding to the single carrier waveform includes 11 PRBs, and the terminal device only maps to 10 PRBs in the 11 PRBs when during resource mapping.

Therefore, in the implementations of this disclosure, when a resource allocation unit is in an interlace structure, because the NR-U system may support a plurality types of SCSs, at a configured BWP, resource allocation using the interlace as the unit in different SCSs may be determined by configuring different offset values for different SCSs, which is convenient for the network device to perform resource allocation, or a PRB incapable of being integrally divided by the interlace may be reserved at a center position of the band width, which facilitates transmission of a PRACH in a case of continuous resource allocation.

Figure 6:
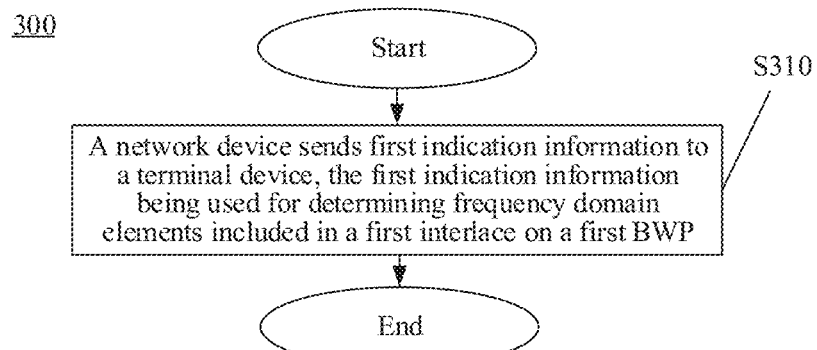
FIG. 6 is a schematic flowchart of another resource allocation method according to an implementation of this disclosure.

FIG. 6 is a schematic flowchart of a resource allocation method 300 according to an implementation of this disclosure. As shown in FIG. 6, the method 300 may include the following content:

S310: A network device sends first indication information to a terminal device, the first indication information being used for determining frequency domain units included in a first interlace on a first BWP.

Optionally, the frequency domain units included in the first interlace are determined according to the first indication information and the first offset value.

Optionally, the first offset value is used for determining frequency domain units included in a basic interlace, the frequency domain units included in the first interlace being specifically determined according to the first indication information and the frequency domain units included in the basic interlace.

Optionally, a frequency domain unit X included in the basic interlace satisfies that:

$\mathrm{Mod}(X, M)$ = the first offset value, where

Mod represents a modulus operation, X represents an index of the frequency domain unit included in the basic interlace, and a value of X ranges from 0 to N−1, M represents a total quantity of interlaces included in the first BWP, N represents a total quantity of frequency domain units included in the first BWP, and M and N are positive integers.

Optionally, a frequency domain unit Y included in the first interlace satisfies that:

$\mathrm{Mod}(Y, M)$ = the first offset value, where

Mod represents a modulus operation, Y represents an index of the frequency domain units included in the first interlace, and a value of Y ranges from 0 to N−1, M represents a total quantity of interlaces included in the first BWP, N represents a total quantity of frequency domain units included in the first BWP, and M and N are positive integers.

Optionally, the network device sends second indication information to the terminal device, the second indication information being used for determining the first offset value.

Optionally, the first offset value is determined according to the first BWP; and/or the first offset value is determined according to a first SCS, the first SCS is a first SCS corresponding to the first BWP; and/or the first offset value is determined according to a value of M, the value of M represents a total quantity of interlaces included in the first BWP.

Optionally, the network device sends third indication information to the terminal device, the third indication information being used for determining the value of M.

Optionally, in the implementations of this disclosure, the network device determines that there is at least one frequency domain unit in the first BWP incapable of being integrally divided by the first interlace, the at least one frequency domain unit being located at a first reserved position in the first BWP, where the frequency domain units included in the first interlace are determined according to the first reserved position and the first indication information.

Optionally, the first reserved position includes a center position of the first BWP.

Optionally, a frequency domain unit corresponding to the first reserved position is used for transmitting an uplink channel in a case of continuous resource allocation.

Optionally, the uplink channel is a PUCCH or a PRACH.

Optionally, the frequency domain units included in the first interlace include a first sub-interlace and a second sub-interlace, the first sub-interlace being used for transmitting a first uplink channel, and the second sub-interlace being used for transmitting a second uplink channel.

For example, the first uplink channel is a PRACH, and the second uplink channel is a PUCCH; or The first uplink channel and the second uplink channel are different PUCCHs.

Specifically, the first sub-interlaces are odd-numbered frequency domain units in the frequency domain units included in the first interlace, and the second sub-interlaces are even-numbered frequency domain units in the frequency domain units included in the first interlace; or The first sub-interlaces are first P frequency domain units in the frequency domain units included in the first interlace, and the second sub-interlaces are last Q frequency domain units in the frequency domain unit includes in the first interlace, P and Q being positive integers.

It should be understood that, for steps in the resource allocation method 300, reference may be made to corresponding steps in the resource allocation method 200. For brevity, details are not described herein again.

Therefore, in the implementations of this disclosure, when a resource allocation unit is in an interlace structure, because the NR-U system supports a plurality types of SCSs, initial positions of interlaces under different SCSs are the same, so that the network device can perform BWP configuration or resource allocation by using the same SCS; or a PRB incapable of being integrally divided by the interlace may be reserved at a center position of the band width, which facilitates transmission of a PRACH in a case of continuous resource allocation.

Figure 7:
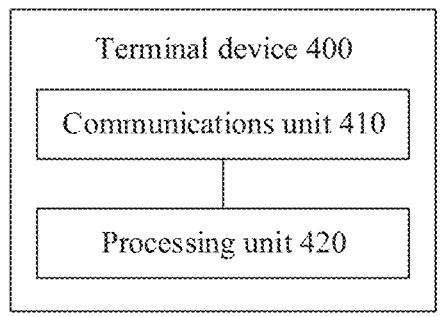
FIG. 7 is a schematic block diagram of a terminal device according to an implementation of this disclosure.

FIG. 7 is a schematic block diagram of a terminal device 400 according to an implementation of this disclosure. As shown in FIG. 7, the terminal device 400 includes:

a communications unit 410, configured to receive first indication information sent by a network device, the first indication information being used for determining frequency domain units included in a first interlace on a first BWP; and a processing unit 420, configured to determine the frequency domain units included in the first interlace according to the first indication information.

Optionally, the processing unit 420 is specifically configured to:

determine the frequency domain units included in the first interlace according to a first offset value and the first indication information.

Optionally, the processing unit 420 is specifically configured to:

determine frequency domain units included in a basic interlace according to the first offset value; and determine the frequency domain units included in the first interlace according to the frequency domain units included in the basic interlace and the first indication information.

Optionally, a frequency domain unit X included in the basic interlace satisfies that:

$$Mod(X,M) = \text{the first offset value, where}$$

Mod represents a modulus operation, X represents an index of the frequency domain unit included in the basic interlace, and a value of X ranges from 0 to N−1, M represents a total quantity of interlaces included in the first BWP, N represents a total quantity of frequency domain units included in the first BWP, and M and N are positive integers.

Optionally, a frequency domain unit Y included in the first interlace satisfies that:

$$Mod(Y,M) = \text{the first offset value, where}$$

Mod represents a modulus operation, Y represents an index of the frequency domain units included in the first interlace, and a value of Y ranges from 0 to N−1, M represents a total quantity of interlaces included in the first BWP, N represents a total quantity of frequency domain units included in the first BWP, and M and N are positive integers.

Optionally, the first offset value is preset; or the first offset value is indicated to the terminal device by the network device through second indication information.

Optionally, the first offset value is determined according to the first BWP; and/or the first offset value is determined according to a first SCS, the first SCS is a first SCS corresponding to the first BWP; and/or the first offset value is determined according to a value of M, the value of M represents a total quantity of interlaces included in the first BWP.

Optionally, the value of M is preset; or the value of M is determined according to the first BWP and the first SCS; or the value of M is indicated to the terminal device by the network device through third indication information.

Optionally, the processing unit 420 is further configured to determine that there is at least one frequency domain unit in the first BWP incapable of being integrally divided by the first interlace, the at least one frequency domain unit being located at a first reserved position in the first BWP; and the processing unit 420 is specifically configured to:

determine the frequency domain units included in the first interlace according to the first reserved position and the first indication information.

Optionally, the first reserved position includes a center position of the first BWP.

Optionally, a frequency domain unit corresponding to the first reserved position is used for transmitting an uplink channel in a case of continuous resource allocation.

Optionally, the uplink channel is a PUCCH or a PRACH.

Optionally, the frequency domain units included in the first interlace include a first sub-interlace and a second sub-interlace, the first sub-interlace being used for transmitting a first uplink channel, and the second sub-interlace being used for transmitting a second uplink channel.

Optionally, the first uplink channel is a PRACH, and the second uplink channel is a PUCCH; or The first uplink channel and the second uplink channel are different PUCCHs.

Optionally, the first sub-interlaces are odd-numbered frequency domain units in the frequency domain units included in the first interlace, and the second sub-interlaces are even-numbered frequency domain units in the frequency domain units included in the first interlace; or The first sub-interlaces are first P frequency domain units in the frequency domain units included in the first interlace, and the second sub-interlaces are last Q frequency domain units in the frequency domain unit includes in the first interlace, P and Q being positive integers.

It should be understood that, the terminal device 400 in the implementations of this disclosure may correspond to the terminal device in the method implementations of this disclosure, and the foregoing operations and/or functions and another operation and/or function of the units in the terminal device 400 are respectively for implementing corresponding procedures of the terminal device in the method 200 shown in FIG. 3. For brevity, details are not described herein again.

Figure 8:
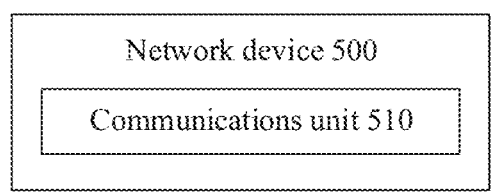
FIG. 8 is a schematic block diagram of a network device according to an implementation of this disclosure.

FIG. 8 is a schematic block diagram of a network device 500 according to an implementation of this disclosure. As shown in FIG. 8, the network device 500 includes:

a communications unit 510, configured to send first indication information to a terminal device, the first indication information being used for determining frequency domain units included in a first interlace on a first BWP.

Optionally, the frequency domain units included in the first interlace are determined according to the first indication information and the first offset value.

Optionally, the first offset value is used for determining frequency domain units included in a basic interlace, the frequency domain units included in the first interlace being specifically determined according to the first indication information and the frequency domain units included in the basic interlace.

Optionally, a frequency domain unit X included in the basic interlace satisfies that:

$$\mathrm{Mod}(X,M) = \text{the first offset value, where}$$

Mod represents a modulus operation, X represents an index of the frequency domain unit included in the basic interlace, and a value of X ranges from 0 to N−1, M represents a total quantity of interlaces included in the first BWP, N represents a total quantity of frequency domain units included in the first BWP, and M and N are positive integers.

Optionally, a frequency domain unit Y included in the first interlace satisfies that:

$$\mathrm{Mod}(Y,M) = \text{the first offset value, where}$$

Mod represents a modulus operation, Y represents an index of the frequency domain units included in the first interlace, and a value of Y ranges from 0 to N−1, M represents a total quantity of interlaces included in the first BWP, N represents a total quantity of frequency domain units included in the first BWP, and M and N are positive integers.

Optionally, the communications unit 510 is further configured to send second indication information to the terminal device, the second indication information being used for determining the first offset value.

Optionally, the first offset value is determined according to the first BWP; and/or the first offset value is determined according to a first SCS, the first SCS is a first SCS corresponding to the first BWP; and/or the first offset value is determined according to a value of M, the value of M represents a total quantity of interlaces included in the first BWP.

Optionally, the communications unit 510 is further configured to send third indication information to the terminal device, the third indication information being used for determining the value of M.

Optionally, the network device 500 further includes:

a processing unit 520, configured to determine that there is at least one frequency domain unit in the first BWP incapable of being integrally divided by the first interlace, the at least one frequency domain unit being located at a first reserved position in the first BWP, where the frequency domain units included in the first interlace are determined according to the first reserved position and the first indication information.

Optionally, the first reserved position includes a center position of the first BWP.

Optionally, a frequency domain unit corresponding to the first reserved position is used for transmitting an uplink channel in a case of continuous resource allocation.

Optionally, the uplink channel is a PUCCH or a PRACH.

Optionally, the frequency domain units included in the first interlace include a first sub-interlace and a second sub-interlace, the first sub-interlace being used for transmitting a first uplink channel, and the second sub-interlace being used for transmitting a second uplink channel.

Optionally, the first uplink channel is a PRACH, and the second uplink channel is a PUCCH; or The first uplink channel and the second uplink channel are different PUCCHs.

Optionally, the first sub-interlaces are odd-numbered frequency domain units in the frequency domain units included in the first interlace, and the second sub-interlaces are even-numbered frequency domain units in the frequency domain units included in the first interlace; or The first sub-interlaces are first P frequency domain units in the frequency domain units included in the first interlace, and the second sub-interlaces are last Q frequency domain units in the frequency domain unit includes in the first interlace, P and Q being positive integers.

It should be understood that, the network device 500 in the implementations of this disclosure may correspond to the network device in the method implementations of this disclosure, and the foregoing operations and/or functions and another operation and/or function of the units in the network device 500 are respectively for implementing corresponding procedures of the network device in the method 300 shown in FIG. 6. For brevity, details are not described herein again.

Figure 9:
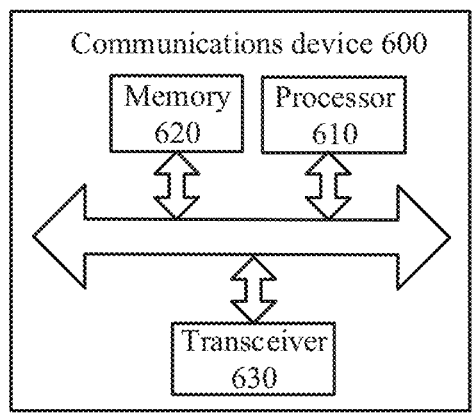
FIG. 9 is a schematic block diagram of a communications device according to an implementation of this disclosure.

FIG. 9 is a schematic structural diagram of a communications device 600 according to an implementation of this disclosure. The communications device 600 shown in FIG. 9 includes a processor 610. The processor 610 may invoke a computer program from a memory and run the computer program, to implement the method in the implementations of this disclosure.

Optionally, as shown in FIG. 9, the communications device 600 may further include a memory 620. The processor 610 may invoke the computer program from the memory 620 and run the computer program, to implement the method in the implementations of this disclosure.

The memory 620 may an independent device independent of the processor 610, or may be integrated in the processor 610.

Optionally, as shown in FIG. 9, the communications device 600 may further include a transceiver 630, and the processor 610 may control the transceiver 630 to communicate with another device. Specifically, the transceiver 630 may send information or data to another device, or receive information or data sent by another device.

The transceiver 630 may include a transmitter and a receiver. The transceiver 630 may further include an antenna, and there may be one or more antennas.

Optionally, the communications device 600 may be specifically the network device in the implementations of this disclosure, and the communications device 600 may implement corresponding procedures implemented by the network device in the methods in the implementations of this disclosure. For brevity, details are not described herein again.

Optionally, the communications device 600 may be specifically a mobile terminal/terminal device in the implementations of this disclosure, and the communications device 600 may implement corresponding procedures implemented by the mobile terminal/terminal device in the methods in the implementations of this disclosure. For brevity, details are not described herein again.

Figure 10:
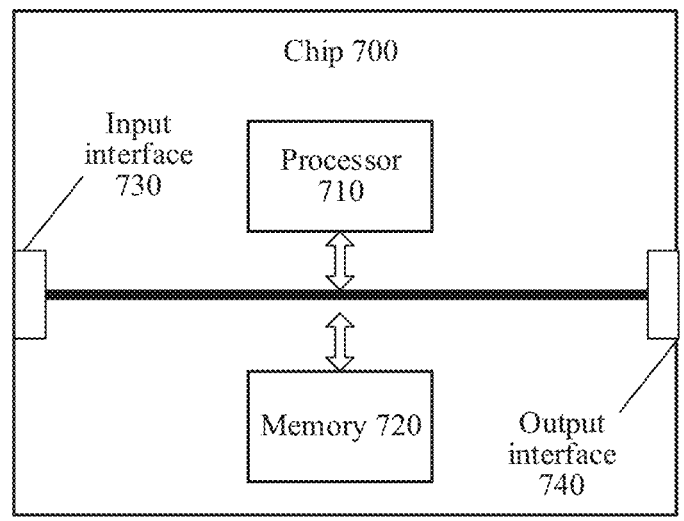
FIG. 10 is a schematic block diagram of a chip according to an implementation of this disclosure.

FIG. 10 is a schematic structural diagram of a chip according to an implementation of this disclosure. The chip 700 shown in FIG. 10 includes a processor 710. The processor 710 may invoke a computer program from a memory and run the computer program, to implement the method in the implementations of this disclosure.

Optionally, as shown in FIG. 10, the chip 700 may further include a memory 720. The processor 710 may invoke the computer program from the memory 720 and run the computer program, to implement the method in the implementations of this disclosure.

The memory 720 may an independent device independent of the processor 710, or may be integrated in the processor 710.

Optionally, the chip 700 may further include an input interface 730. The processor 710 may control the input interface 730 to communicate with another device or chip, and specifically, may obtain information or data sent by another device or chip.

Optionally, the chip 700 may further include an output interface 740. The processor 710 may control the output interface 740 to communicate with another device or chip, and specifically, may output information or data to another device or chip.

Optionally, the chip may be applied to the network device in the implementations of this disclosure, and the chip may implement corresponding procedures implemented by the network device in the methods in the implementations of this disclosure. For brevity, details are not described herein again.

Optionally, the chip may be applied to a mobile terminal/terminal device in the implementations of this disclosure, and the chip may implement corresponding procedures implemented by the mobile terminal/terminal device in the methods in the implementations of this disclosure. For brevity, details are not described herein again.

It should be understood that, the chip mentioned in the implementations of this disclosure may also be referred to as a system-level chip, a system chip, a chip system, a system on chip, or the like.

Figure 11:
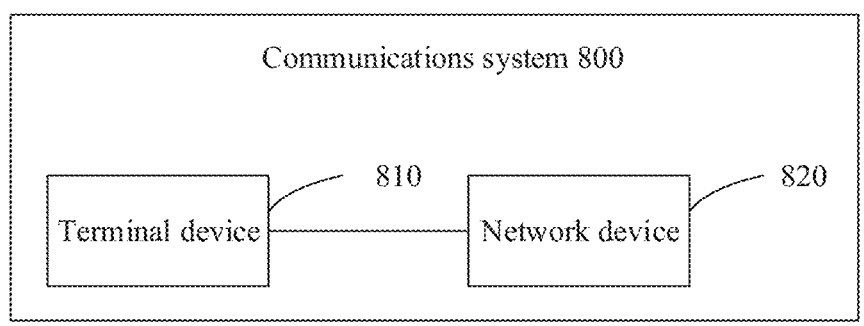
FIG. 11 is a schematic block diagram of a communications system according to an implementation of this disclosure.

FIG. 11 is a schematic block diagram of a communications system 800 according to an implementation of this disclosure. As shown in FIG. 11, the communications system 800 includes a terminal device 810 and a network device 820.

The terminal device 810 may be configured to implement the corresponding functions implemented by a terminal device in the foregoing method, and the network device 820 may be configured to implement the corresponding functions implemented by a network device in the foregoing method. For brevity, details are not described herein again.

It should be understood that, the processor in the implementations of this disclosure may be an integrated circuit chip, and has a signal processing capability. During implementation, the steps of the foregoing method implementations may be implemented by using a hardware integrated logic circuit in the processor or implemented by using an instruction in a software form. The foregoing processor may be a general-purpose processor, a digital signal processor (DSP), an disclosure specific integrated circuit (ASIC), a field programmable gate array (FPGA), or another programmable logical device, discrete gate or transistor logical device, or discrete hardware component, and may implement or perform the methods, the steps, and logical block diagrams that are disclosed in the implementations of this disclosure. The general-purpose processor may be a microprocessor, or the processor may be any conventional processor or the like. Steps of the methods disclosed with reference to the implementations of this disclosure may be directly performed or completed by using a hardware decoding processor, or may be performed or completed by using an combination of hardware and a software module in the decoding processor. The software module may be located in a mature storage medium in the art, for example, a random access memory (RAM), a flash memory, a ROM, a programmable ROM, an electrically erasable programmable memory, or a register. The storage medium is located in the memory, and the processor reads information in the memory and completes the steps in the foregoing methods in combination with hardware of the processor.

It can be understood that, the memory in the implementations of this disclosure may be a volatile memory or a non-volatile memory, or may include both a volatile memory and a non-volatile memory. The non-volatile memory may be a read-only memory (ROM), a programmable ROM (PROM), an erasable programmable ROM (EPROM), an electrically EPROM (EEPROM), or a flash memory. The volatile memory may be a random access memory (RAM), and is used as an external cache. Through exemplary but not limitative description, RAMs in many forms may be used, for example, a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It should be noted that, the memory for the system and the method described herein intends to include, but not limited to, the memories and any other suitable types of memories.

It should be understood that, the foregoing description of the memory is illustrative, but is not limitative. For example, the memory in the implementations of this disclosure may be alternatively a static RAM (SRAM), a dynamic RAM (DRAM), a synchronous DRAM (SDRAM), a double data rate SDRAM (DDR SDRAM), an enhanced SDRAM (ES-DRAM), a synchlink SDRAM (SLDRAM), a direct rambus RAM (DR RAM), or the like. That is, the memory described in this implementation of this disclosure intends to include, but not limited to, the memories and any other suitable types of memories.

An implementation of this disclosure further provides a computer-readable storage medium, configured to store a computer program.

Optionally, the computer-readable storage medium may be applied to the network device in the implementations of this disclosure, and the computer program enables a computer to perform corresponding procedures implemented by the network device in the methods in the implementations of this disclosure. For brevity, details are not described herein again.

Optionally, the computer-readable storage medium may be applied to the mobile terminal/terminal device in the implementations of this disclosure, and the computer program enables a computer to perform corresponding procedures implemented by the mobile terminal/terminal device in the methods in the implementations of this disclosure. For brevity, details are not described herein again.

An implementation of this disclosure further provides a computer program product, including a computer program instruction.

Optionally, the computer program product may be applied to the network device in the implementations of this disclosure, and the computer program instruction enables a computer to perform corresponding procedures implemented by the network device in the methods in the implementations of this disclosure. For brevity, details are not described herein again.

Optionally, the computer program product may be applied to the mobile terminal/terminal device in the implementations of this disclosure, and the computer program instruction enables a computer to perform corresponding procedures implemented by the mobile terminal/terminal device in the methods in the implementations of this disclosure. For brevity, details are not described herein again.

An implementation of this disclosure further provides a computer program.

Optionally, the computer program may be applied to the network device in the implementations of this disclosure, and when the computer program is run on a computer, the computer is enabled to perform corresponding procedures implemented by the network device in the methods in the implementations of this disclosure. For brevity, details are not described herein again.

Optionally, the computer program may be applied to the mobile terminal/terminal device in the implementations of this disclosure, and when the computer program is run on the computer, the computer is enabled to perform corresponding procedures implemented by the mobile terminal/terminal device in the methods in the implementations of this disclosure. For brevity, details are not described herein again.

A person of ordinary skill in the art may notice that the exemplary units and algorithm steps described with reference to the implementations disclosed in this specification can be implemented in electronic hardware, or a combination of computer software and electronic hardware. Whether the functions are executed in a mode of hardware or software depends on particular disclosures and design constraint conditions of the technical solutions. A person skilled in the art may use different methods to implement the described functions for each particular disclosure, but it should not be considered that the implementation goes beyond the scope of this disclosure.

A person skilled in the art may clearly understand that, for simple and clear description, for specific work processes of the foregoing described system, apparatus, and unit, reference may be made to corresponding process in the foregoing method implementations, and details are not described herein again.

In the several implementations provided in this disclosure, it should be understood that the disclosed system, apparatus, and method may be implemented in other manners. For example, the described apparatus implementation is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in 00electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the implementations.

In addition, functional units in the implementations of this disclosure may be integrated into one processing unit, or each of the units may exist alone physically, or two or more units are integrated into one unit.

If implemented in the form of software functional units and sold or used as an independent product, the functions may also be stored in a computer-readable storage medium. Based on such an understanding, the technical solutions of this disclosure essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the implementation of this disclosure. The foregoing storage medium includes: any medium that can store program code, such as a universal serial bus (USB) flash disk, a removable hard disk, a ROM a RAM, a magnetic disk, or an optical disc.

The descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A resource allocation method, comprising:
receiving, by a terminal device, first indication information, the first indication information being used for indicating frequency domain units comprised in a first interlace index on a first band width part (BWP); and
determining, by the terminal device, the frequency domain units comprised in the first interlace index on the first BWP according to a first offset value and the first indication information,
wherein the determining, by the terminal device, the frequency domain units comprised in the first interlace index on the first BWP according to the first offset value and the first indication information comprises:
determining, by the terminal device, frequency domain units comprised in a basic interlace index on the first BWP according to the first offset value; and
determining, by the terminal device, the frequency domain units comprised in the first interlace index on the first BWP according to the frequency domain units comprised in the basic interlace index and the first indication information.

2. The method according to claim 1, wherein
the first offset value is configured for determining frequency domain units comprised in a basic interlace index on the first BWP.

3. The method according to claim 1, wherein a frequency domain unit X comprised in the basic interlace index on the first BWP satisfies that:

$$\mathrm{Mod}(X,M) = \text{the first offset value, wherein}$$

Mod represents a modulus operation, X represents an index of the frequency domain unit comprised in the basic interlace index, a value of X ranges from 0 to N−1, M represents a total quantity of interlaces comprised in the first BWP, N represents a total quantity of frequency domain units comprised in the first BWP, and M and N are positive integers.

4. The method according to claim 1, wherein the first offset value is configured for determining the frequency domain units comprised in in the first interlace index on the first BWP.

5. The method according to claim 1, wherein a frequency domain unit Y comprised in the first interlace index on the first BWP satisfies that:

$$Mod(Y,M) = \text{the first offset value, wherein}$$

Mod represents a modulus operation, Y represents an index of the frequency domain unit comprised in the first interlace index, and a value of Y ranges from 0 to N−1, M represents a total quantity of interlaces comprised in the first BWP, N represents a total quantity of frequency domain units comprised in the first BWP, and M and N are positive integers.

6. The method according to claim 1, wherein
the first offset value is preset; or
the first offset value is indicated to the terminal device by a network device according to second indication information.

7. The method according to claim 1, wherein
the first offset value is determined according to one of the first BWP, a first SCS, and a value of M; wherein the first SCS is a first SCS corresponding to the first BWP, the value of M representing the total quantity of the interlaces comprised in the first BWP.

8. The method according to claim 7, wherein
the value of M is preset; or
the value of M is determined according to the first BWP and the first SCS; or
the value of M is indicated to the terminal device by a network device according to third indication information.

9. The method according to claim 1, further comprising a first frequency domain unit set comprises the frequency domain units comprised in the first interlace index on the first BWP, wherein the first frequency domain unit set is configured for transmitting an uplink channel.

10. A terminal device, comprising a processor and a memory, wherein the memory is configured to store a computer program, which, when being executed by the processor, enables the terminal device to:
receive first indication information, the first indication information being used for indicating frequency domain units comprised in a first interlace index on a first band width part (BWP); and
determine the frequency domain units comprised in the first interlace index on the first BWP according to a first offset value and the first indication information,
wherein the computer program, when being executed by the processor, enables the terminal device to:
determine frequency domain units comprised in a basic interlace index on the first BWP according to the first offset value; and
determine the frequency domain units comprised in the first interlace index on the first BWP according to the frequency domain units comprised in the basic interlace index and the first indication information.

11. The terminal device according to claim 10, wherein the first offset value is configured for determining frequency domain units comprised in a basic interlace index on the first BWP.

12. The terminal device according to claim 10, wherein a frequency domain unit X comprised in the basic interlace index on the first BWP satisfies that:

$$Mod(X,M) = \text{the first offset value, wherein}$$

Mod represents a modulus operation, X represents an index of the frequency domain unit comprised in the basic interlace index with a value ranging from 0 to N−1, M represents a total quantity of the interlaces comprised in the first BWP, N represents a total quantity of the frequency domain units comprised in the first BWP, and both M and N are positive integers.

13. The terminal device according to claim 10, wherein the first offset value is configured for determining the frequency domain units comprised in in the first interlace index on the first BWP.

* * * * *